United States Patent [19]

Szegda

[11] Patent Number: 5,371,819
[45] Date of Patent: Dec. 6, 1994

[54] FIBER OPTIC CABLE END CONNECTOR WITH ELECTRICAL GROUNDING MEANS

[75] Inventor: Andrew Szegda, Canastota, N.Y.

[73] Assignee: John Mezzalingua Assoc. Inc., Manlius, N.Y.

[21] Appl. No.: 135,876

[22] Filed: Oct. 12, 1993

Related U.S. Application Data

[60] Division of Ser. No. 832,706, Feb. 7, 1992, Pat. No. 5,315,684, which is a continuation-in-part of Ser. No. 713,821, Jun. 12, 1991, abandoned.

[51] Int. Cl.[5] ............................................. G02B 6/245
[52] U.S. Cl. ................................... 385/75; 385/87; 385/101; 385/139; 385/147; 439/98
[58] Field of Search ................... 385/100, 101, 75, 69, 385/86, 87, 136, 139, 147; 361/118, 119; 439/86, 88, 89, 92, 95, 96, 97, 98, 108

[56] References Cited

U.S. PATENT DOCUMENTS

| | | |
|---|---|---|
| 1,186,813 | 6/1916 | McFerran . |
| 2,470,538 | 5/1949 | Wolfram et al. ............ 285/86 |
| 2,678,963 | 5/1954 | Everhart ..................... 174/48 |
| 3,243,207 | 3/1966 | Carpenter et al. ........... 285/248 |
| 3,748,551 | 7/1973 | Petersen ..................... 317/246 |
| 3,843,832 | 10/1974 | Petersen et al. ............. 174/151 |
| 3,846,010 | 11/1974 | Love et al. .................. 385/54 |
| 3,856,983 | 12/1974 | Fisher et al. ................ 174/151 |
| 3,883,681 | 5/1975 | Campbell .................... 174/65 |
| 3,999,837 | 12/1976 | Bowen et al. ............... 385/54 |
| 4,008,948 | 2/1977 | Dalgleish et al. ............ 385/66 |
| 4,168,921 | 9/1979 | Blanchard .................. 403/19 |
| 4,217,031 | 8/1980 | Mignien et al. ............. 385/64 |
| 4,236,787 | 12/1980 | Iacono et al. ............... 385/66 |
| 4,253,730 | 3/1981 | Logan et al. ................ 385/66 |
| 4,291,941 | 9/1981 | Melzer ....................... 385/74 |
| 4,346,958 | 8/1982 | Blanchard .................. 439/584 |
| 4,406,515 | 9/1983 | Roberts ...................... 385/72 |
| 4,444,461 | 4/1984 | Wey et al. .................. 385/72 |
| 4,447,120 | 5/1984 | Borsuk ....................... 385/136 |
| 4,458,983 | 7/1984 | Roberts ...................... 385/81 |
| 4,461,538 | 7/1984 | Breed, III et al. ........... 385/88 |
| 4,461,539 | 7/1984 | Bailey et al. ................ 385/73 |
| 4,486,072 | 12/1984 | Roberts ...................... 385/64 |
| 4,573,760 | 3/1986 | Fan et al. ................... 385/85 |
| 4,589,688 | 5/1986 | Johnson ..................... 285/12 |
| 4,676,577 | 6/1987 | Szegda ...................... 439/584 |
| 4,679,895 | 7/1987 | Huber ........................ 385/87 |
| 4,759,601 | 7/1988 | Knutsen et al. ............. 385/61 |
| 4,772,090 | 9/1988 | Atkins et al. ............... 385/101 |
| 4,790,765 | 12/1988 | Ehrenfels et al. ........... 439/96 |
| 4,842,364 | 7/1989 | Chen ......................... 385/136 |
| 4,857,015 | 8/1989 | Michaels et al. ............ 439/610 |
| 4,871,121 | 10/1989 | Kodaka et al. .............. 242/54 R |
| 4,887,971 | 12/1989 | Reuss et al. ................ 439/98 |
| 5,315,684 | 5/1994 | Szegda ...................... 385/139 |

FOREIGN PATENT DOCUMENTS

| | | | |
|---|---|---|---|
| 405666A3 | 1/1991 | European Pat. Off. | G02B 6/38 |
| 3813076A1 | 11/1989 | Germany | G02B 6/36 |
| 2096348A | 10/1982 | United Kingdom | G02B 7/26 |
| WO86/06472 | 11/1986 | WIPO | G02B 6/42 |
| WO90/04799 | 5/1990 | WIPO | G02B 6/36 |

Primary Examiner—Frank Gonzalez
Attorney, Agent, or Firm—Samuels, Gauthier & Stevens

[57] ABSTRACT

An end connector for fiber optic transport cables. A cable clamp received within a passageway of a housing which receives the cable is provided to hold the cable in a secured position so as to resist rotational and longitudinal forces applied to the cable. Support coupling units are provided both internal and external the equipment which the cable is to be connected to. The coupling units allow the end connector to be coupled to and decoupled from the equipment without unnecessary rotation of the end connector and cable and without having to remove the cable from the end connector. Grounding components are provided for grounding conductive members associated with the cable so as to prevent damage due to voltage surges and to prevent RF signal leakage.

6 Claims, 6 Drawing Sheets

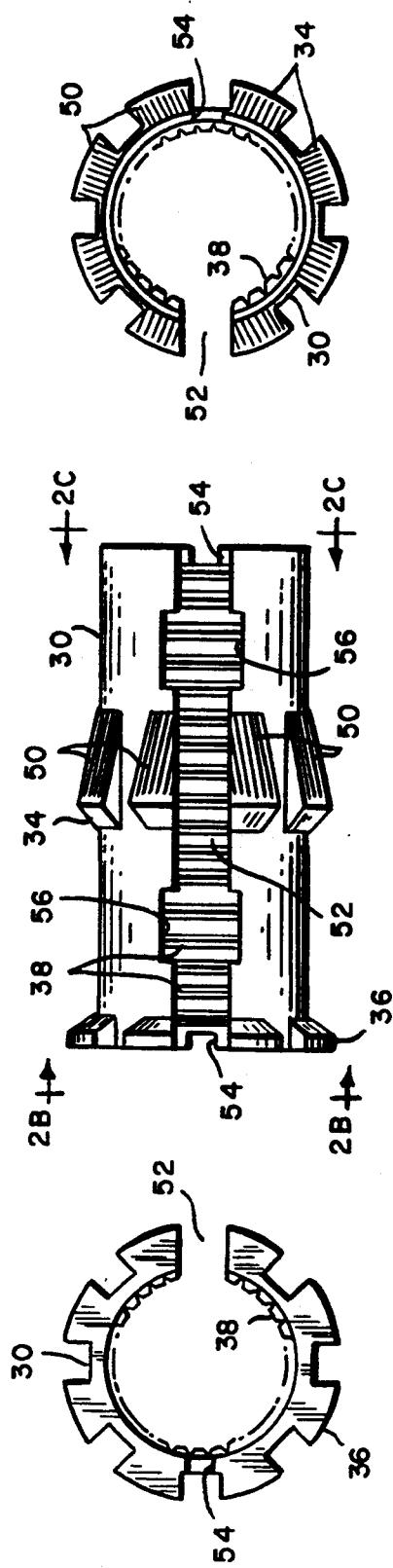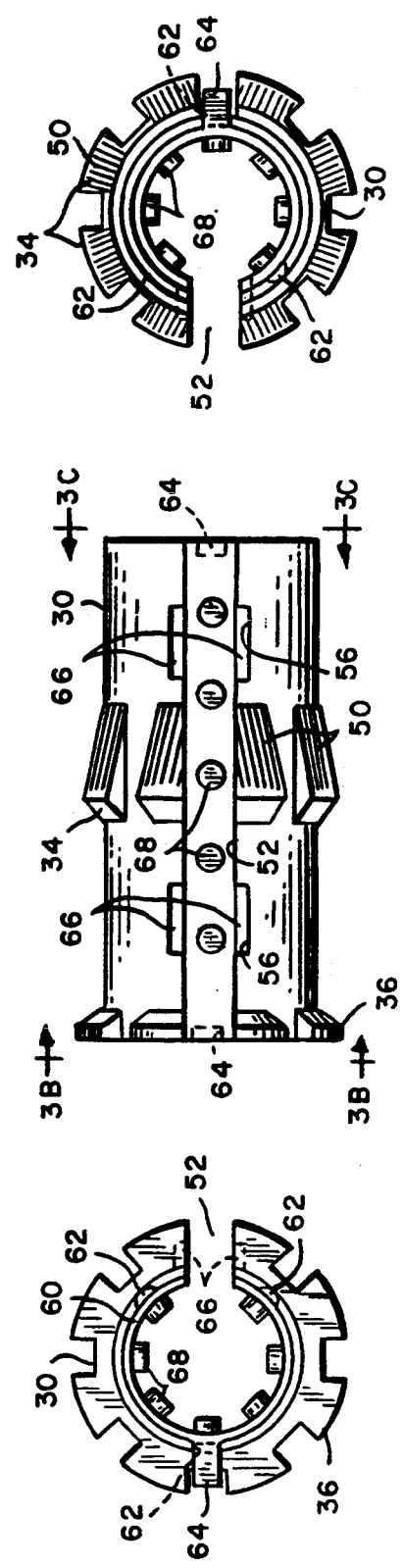

FIBER OPTIC CABLE END CONNECTOR WITH ELECTRICAL GROUNDING MEANS

This is a divisional of copending application(s) Ser. No. 07/832,706 filed on Feb. 7, 1992 and now U.S. Pat. No. 5,315,684 which is a continuation-in-part of Ser. No. 07/713,821, filed on Jun. 12, 1991, now abandoned.

BACKGROUND OF THE INVENTION

This invention relates to end connectors used to connect fiber optic transport cables to equipment ports, terminals or the like.

Fiber optic technology is being increasingly adapted for various applications in industries such as cable television for replacing coaxial cables. Such adaptations involve varying hybrid fiber optic systems, wherein fiber optic transport cables are linked to down-line optical repeaters or amplifiers, and to junctions where a conversion from light wave frequencies to radio frequencies for distribution to associated equipment takes place. The use of fiber optics in an industry such as cable television allows for the increases in both the reliability and number of channels of the system. The technology also allows for the expansion of basic television service to include services such as HDTV (high definition television), and PCN (personal communication networks) so that the cable television system may compete with the telephone industry.

The cables being utilized in such systems are configured to protect and transport optic fibers, varying from a single fiber to hundreds of fibers. The cables are manufactured in a number of configurations, and most include various structural strength and support menders with an outer protective dielectric plastic jacket. A variety of support members are available including corrugated metallic sheaths, plastic or glass fillers, peripheral strength member steel wires, glass filament rods or Kevlar TM placed in center support wires. Such support members are critical components given the hostile environments in which the cables are employed, i.e. placement in tunnels, fed through conduits, buried underground, or pole-to-pole connections. The individual optic fibers, as well as groups of fibers, are carried in small hard protective tubes within the cable. The optic fibers are delicate and cannot be subjected to damage or stresses from bending, stretching, moisture or chemical intrusion, excessive rotational or longitudinal stresses on the cable or any other circumstance that could effect the optical transmission characteristic of the individual optic fibers. Furthermore, damage to the optic fibers may result from excessive rotational and radial stresses involved in linking the cable to the intended operational equipment.

Such cables may range in size from approximately $\frac{3}{8}$ inch diameter to approximately one inch in diameter, and can be slightly out of round.

It is therefore an object of the present invention to provide a fiber optic transport cable end connector which supports a cable in a secured position so as to resist rotational and longitudinal forces while being able to accommodate a wide range of cable sizes and cross-sectional shapes.

It is a still further object of the present invention to provide an end connector which may be easily coupled to and decoupled from associated equipment without the cable being subjected to excessive and potentially damaging rotational and longitudinal stresses, or from having to remove the cable from the end connector in the process.

It is a further object of the present invention to provide an end connector which seals the optic fibers of a cable from exposure to environmental conditions.

It is yet a further object of the present invention to provide an end connector which effectively grounds conductive members associated with the cable so as to prevent RF signal leakage.

SUMMARY OF THE INVENTION

An end connector in accordance with the present invention has a housing member with a through passageway extending from a front end to a rear end thereof. A coupling unit is provided for coupling the housing member to a port of an associated equipment. A clamp means is configured to be received in the passageway and is adapted to at least partially surround the cable. The clamp means is adjustable between an expanded state which accommodates movement of the cable with respect to the housing and a constricted state which fixedly secures the cable with respect to the housing. A clamp adjustment means adjusts the clamp means between the expanded and the constricted states.

Another aspect of the present invention provides an end connector having a clamp housing member adapted to clamp the cable in a secure position so as to provide resistance to longitudinal and rotational forces applied to the cable. The end connector includes a coupling unit for releasably coupling the clamp housing member and the cable to a port of an associated equipment. A cable supporting unit is provided inside the equipment for supporting the cable within the equipment and is releasably coupled to the coupling unit.

According to another aspect of the present invention, an end connector is provided having a clamp housing member adapted to clamp a cable in a secure position so as to provide resistance to longitudinal and rotational forces applied to the cable. A front end coupler is disposed at a front end of the clamp housing member. A cable supporting unit is provided external the equipment for supporting the cable and is releasably coupled at one end to the front end coupler and is releasably coupled at the opposite end to a port associated with an equipment such that the end connector may be coupled and decoupled as a unit from the port without rotating the housing member and the cable, and without removing the cable from the end connector.

BRIEF DESCRIPTION OF THE DRAWINGS

FIG. 2A is a side view of a cable clamp in accordance with the present invention;

FIGS. 2B and 2C are rear and front views taken respectively along lines 2B—2B and 2C—2C of FIG. 2A;

FIG. 3A is a side view of the cable clamp illustrated in FIG. 2A with the addition of an insert;

FIGS. 3B and 3C are rear and front views taken respectively along lines 3B—3B and 3C—3C of FIG. 3A;

DESCRIPTION OF THE ILLUSTRATED EMBODIMENTS

Figure 1:
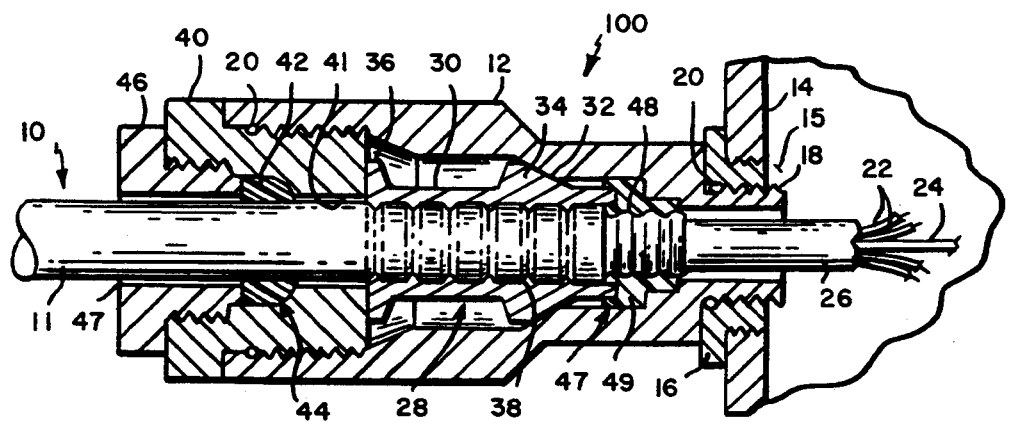
FIG. 1 is a longitudinal sectional view showing an end connector in accordance with the present invention coupling a fiber optic cable to an associated equipment port.

With reference to FIG. 1, an end connector in accordance with the present invention is generally indicated at 100.

In the example herein selected for illustrative purposes, a fiber optic transport cable 10 is illustrated as including a plurality of optic fibers 22 with a center support wire 24, which may be metallic so as to be conductive or made of a non-conductive fiber such as Kevlar TM or non-conductive fiberglass rod. The cable 10 may further include an inner non-conductive sheath 26 and/or a corrugated armor sheath 48 which surrounds and protects the optic fibers 22. An outer dielectric protective covering or jacket 11 surrounds and encloses all of the cable components.

As shown in FIG. 1, the end connector 100 enables the cable 10 to be coupled to down-line equipment 14 at a port 15. The end connector includes a housing 12 having an externally threaded coupling extension 18 at the front end thereof. The coupling extension 18 is arranged to be releasably coupled to an internally threaded port bushing 16 by threaded engagement. An O-ring 20 is provided between the extension 18 and the bushing 16. The port bushing 16 may itself also be threadingly engaged to the equipment 14.

A through passageway 28 extends from front to rear through the housing 12. The passageway 28 accommodates passage of the cable 10 through the housing 12 and into the equipment 14.

A cable clamp 30 is provided within the passageway 28 for fixing the cable 10 securely within the housing 12. The cable clamp 30 is constructed as a resilient split sleeve and is configured to be slideably disposed within the passageway 28 at a location substantially surrounding the cable 10.

Referring additionally to FIGS. 2A–2C, and 3A–3C, it will be seen that the cable clamp 30 includes a plurality of ramp-shaped shoulders 34 circumferentially spaced around a central portion of its outer surface. The cable clamp also includes a longitudinal slot 52 which allows the cable clamp to resiliently compress and expand so as to increase or decrease clamping pressure on the cable 10. A plurality of segmented, axially spaced annular ridges 38 are provided along the inner surface of the cable clamp. The annular ridges may be serrated to form teeth-like projections. In addition, a segmented external flange 36 is provided at the rear end of the cable clamp.

A clamp nut 40 having a passageway 41 for the cable 10 is configured to be releasably coupled to the rear end portion of the housing 12 by threaded engagement. An O-ring 20 provides a seal between the clamp nut and the housing. The front end portion of the clamp nut 40 abuts the segmented flange 36 to thereby urge the cable clamp 30 forwardly as the clamp nut is threaded into the housing. As the cable clamp is forwardly displaced, the shoulders 34 come into contact with a conical portion 32 of the housing interior surrounding the passageway 28. The contact between the shoulders 34 and the conical portion 32 provide an inwardly directed force which resiliently compresses the cable clamp 30, thus providing increased clamping pressure on the cable. As the cable clamp is compressed, the annular ridges 38 slightly penetrate the jacket 11 of the cable with a biting action that provides ample traction and holding power without subjecting the cable to potentially damaging distortion. During disassembly, the cable clamp 30 expands resiliently as the cable nut 40 is disengaged from the rear end of the housing 12. The expansion of the cable clamp allows enough clearance between the jacket 11 and the annular ridges 38 so that the cable 10 may be removed from the housing during maintenance procedures.

The clamping pressure applied to the cable 10 effectively holds the cable in a secure position and provides resistance to rotational and longitudinal forces applied to the cable during installation or operation. The segmented or axially spaced annular ridges 38 provide excellent resistance to rotational twisting or slippage. Due to the segmentation or axial spacing, the annular ridges 38 bite into the jacket 11 and resist rotational slippage, which would not occur if the annular ridges were not axially spaced.

The shoulders 34 of the cable clamp 30 have roughened or knurled surfaces 50 which contact the conical portion 32 of the inner surface of the housing 12. The surfaces 50 provide further resistance to rotational movement of the cable clamp and cable as the end connector 100 is being manipulated during installation.

The cable clamp 30 is configured to accommodate a broad range of cable sizes and shapes without requiring a change in the size of the housing 12 and related components. The cable clamp 30 itself is capable of handling a range of cable sizes. In order to increase the range of cable sizes which may be handled by the end connector 100, a split sleeve insert 60 of thin flexible material may be provided for insertion within the cable clamp 30, as shown in FIGS. 3A-3C. The inner surface of the sleeve insert 60 is provided with a plurality of radially inwardly directed protrusions or teeth 68 which are capable of biting the jacket 11 of smaller sized cables 10 so as to provide longitudinal and circumferential holding power. The teeth 68 are located longitudinally and annularly on the inner surface of the sleeve insert 60, and are spaced so as to clamp the cable 10 without pinching, squeezing or fracturing the jacket 11, while at the same time providing increased holding traction. The sleeve insert 60 includes end tabs 64 and side tabs 66 which engage end tab slots 54 in the segmented end flange 36 and side tab slots 56 bordering slot 52, respectively, of the cable clamp 30. This allows the sleeve insert to be locked in place inside the cable clamp and ensures that the sleeve insert functions in accordance with the compression or expansion of the cable clamp without rotating or sliding.

In order to accommodate a broad range of cable sizes while maintaining flexibility and resiliency of the sleeve insert 60, preferably the wall thickness of the sleeve insert is reduced. In order to compensate for such reductions in wall thickness and maintain the necessary clamp surface to cable relationship for adequate clamping action, external pads 62 are provided and protrude radially outward from the outer surface of the sleeve insert 60 to come into contact with the inner surface of the cable clamp 30. Thus, the sleeve insert 60 enables the end connector 100 to be adaptable to a wide range of cable sizes.

With respect to the clamp nut 40 shown in FIG. 1, the passage 41 defines a recess 44 which is arranged to receive a sealing grommet 42. The passage 41 is also configured to receive a seal nut 46 at the rear end portion of the clamp nut 40. The seal nut 46 is releasably coupled to the clamp nut by threaded engagement. An annular passage 47 is also defined through the seal nut 46 for passing the cable 10 therethrough.

The sealing grommet 42 is configured to surround the cable and is intended to provide a moisture seal between the cable 10 and the end connector 100 at the point where the cable exits the end connector. The recess 44 of the clamp nut 40 has a radial or tapered front end so that the grommet 42 is directed toward the cable as the grommet is displaced in a forward direction as the seal nut 46 is threaded into the clamp nut. The sealing grommet is preferably constructed from a pliable material so that when it is deformed within the recess 44, the grommet effectively seals irregular surfaces and the odd shaped diameters of the cables utilized in the end connector. The compressed sealing grommet 42 provides a pressure seal, thus preventing moisture or other foreign material from entering into the end connector, cable, or equipment along the surface of the cable. This pressure seal also provides strain relief for the cable 10, in that it provides some flexibility for the cable at the point of emergence from the end connector such that the cable can flex and thereby avoid deformation or fracturing.

In those cases where a cable 10 having an inner corrugated armor sheath 48 is utilized, it is desirable to ground such cable support members. To this end, a seal 49 constructed of pliable, electrically conductive (low resistance) material is provided at a location surrounding a portion of the exposed armor sheath 48. The conductive seal is disposed within a recess 47 of the passageway 28 at the front end portion of the housing 12 adjacent the front end of the cable clamp 30. As previously described, once the cable 10 is fully inserted through the end connector 100, the cable clamp 30 is driven forward in the clamping process. The forward displacement of the cable clamp results in the clamping of the cable 10, and at the same time the front end of the cable clamp forces the conductive seal 49 to compress within the recess 47. The compression of the conductive seal causes it to conform to the shape of the recess and to come into intimate contact with the armor sheath 48. Thus, an electrical contact is created between the conductive seal and the adjacent inner surface of the housing 12.

The contact between the armor sheath 48 and the conductive seal 49 serves to ground the sheath and effectively creates an RF seal. While optical signals associated with the fiber optics do not typically radiate spurious signals, the armor sheath 48 must be grounded in order to prevent the sheath itself from becoming a transmitting antenna for stray RF signals which may be released from the RF portion of the equipment to which the cable is connected, or from high powered transmitters in the vicinity of the cable. The conductive seal 49 serves to provide optimum shielding from RF leakage by conforming to the size and possibly out of round shape of the cable 12.

Figure 4A:
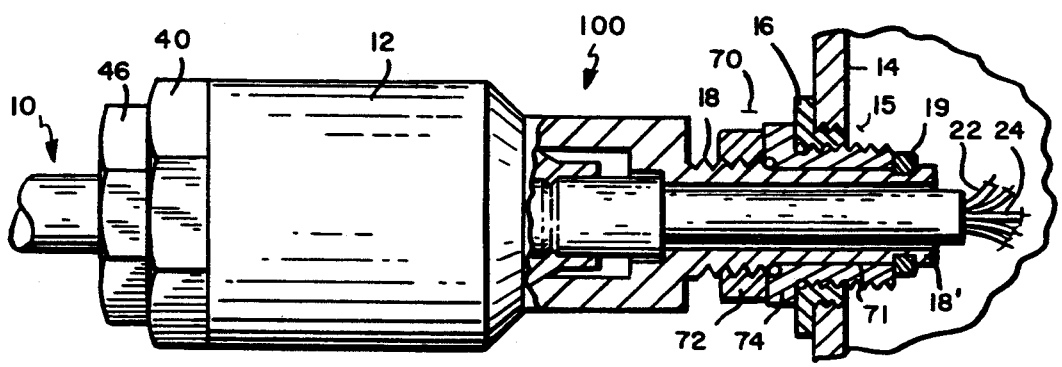
FIG. 4A is a longitudinal sectional view of the end connector of the present invention including a disconnect coupler assembled to the housing port.
Figure 4B:
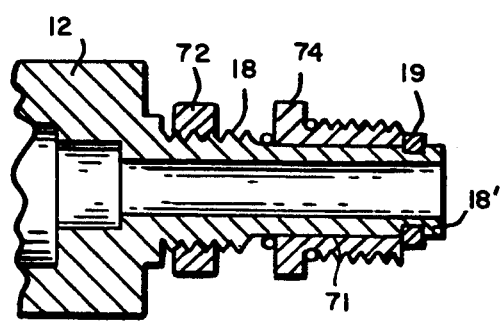
FIG. 4B is a partial longitudinal sectional view of the end connector of the present invention including the disconnect coupler in a disassembled state.

With reference now to FIGS. 4A and 4B, the end connector 100 according to the present invention is illustrated in combination with a quick disconnect coupler 70 which releasably couples the housing 12 to the port 15. The disconnect coupler 70 includes a housing coupling nut 72 which is releasably coupled by threaded engagement to the threaded coupling extension 18 of the housing, and a port coupling bushing 74 which is freely rotatable on and slidable along a smooth extension 18' of the housing. The port coupling bushing 74 is captured on the smooth extension 18' by a C-ring 19 which snaps into a groove at the end of the smooth extension. The coupling bushing 74 is releasably coupled by threaded engagement to the port bushing 16. The coupler 70 also includes a passageway 71 for receiving the extension 18' which holds a portion of the cable 10. The coupler 70 provides a means for disconnecting the housing 12 and the cable 10 from the equipment 14 without requiring the removal of the cable from the housing, and further allows the housing to be connected and disconnected to the equipment without undesirable rotational movement of the housing. This is possible due to the housing coupling nut 72 and the port coupling bushing 74 co-acting as a unit, while each component may independently rotate with respect to the other. Therefore, the port coupling bushing 74 may be initially threadingly engaged into the bushing 16, such that the port coupling bushing bears against the c-ring as it is being threaded into the bushing 16, and drives the extension 18 into the equipment through passageway 71. Thereafter, the housing coupling nut may be threadedly advanced to bear against and rotatably fix the coupling bushing 74, thereby securing the housing 12 to the coupler 70.

Figure 5:
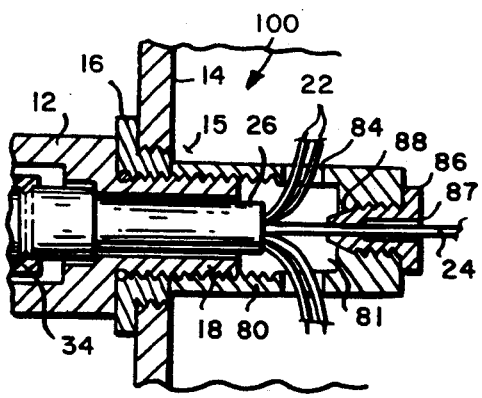
FIG. 5 is a longitudinal sectional view of the end connector of the present invention including a cable support member located within the equipment.

FIG. 5 illustrates an embodiment of the end connector 100 according to the present invention including a tubular cable support member 80 disposed within the equipment 14 for internally supporting the cable 10. The cable support member defines a passageway 81 for receiving a portion of the cable 10. The support member is internally threaded at the rear end thereof so as to be releasably coupled by threaded engagement with the threaded coupling extension 18 of the housing 12. Openings 84 are provided through which optic fibers 22 may be retrieved from the passageway 81 so as to accommodate further connections not illustrated.

An anchor nut 86, which defines a passageway 87 for receiving the center support wire 24 associated with the cable, is configured to be releasably coupled by threaded engagement to a front end of the support member 80. As the anchor nut is threaded into the front end of the support member, a clamping portion 88 clamps onto a portion of the center support wire and holds it in a secured position. It will be appreciated by those of ordinary skill in the art that the anchor nut 86 and the support member 80 may be constructed of conductive materials so that the cable support member 80 serves to ground the center support wire if it is also constructed from a conductive material.

Figure 6:
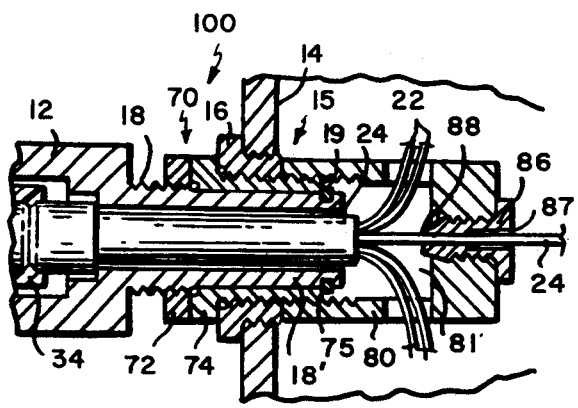
FIG. 6 is a longitudinal sectional view of an end connector of the present invention including both the disconnect coupler shown in FIG. 4 and the cable support member shown in FIG. 5.

FIG. 6 illustrates an alternate embodiment of the end connector 100 according to the present invention which utilizes the cable support member 80 as shown in FIG. 5 and the disconnect coupler 70 as shown in FIG. 4. The support member 80 is shown being threadingly coupled with an extended threaded portion 75 of the port coupling bushing 74.

Figure 7:
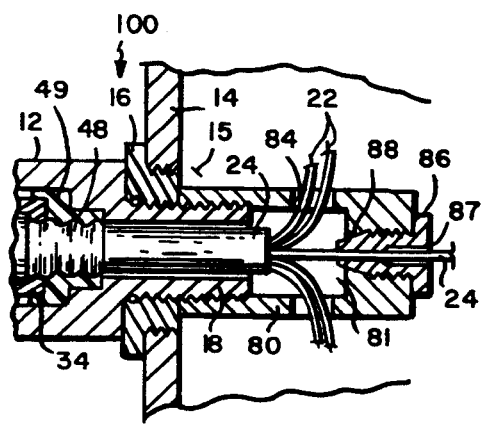
FIG. 7 is a longitudinal sectional view of an alternate embodiment of an end connector of the present invention with a cable support member of the type shown in FIG. 5.

FIG. 7 illustrates an alternate embodiment of the end connector 100 according to the present invention, wherein the cable 10 includes both the center support wire 24 and the corrugated armor sheath 48. The cable support member 80 as illustrated in FIG. 5 is utilized to anchor the center support wire. Due to the need for grounding the armor sheath 48, the conductive seal 49 as described with reference to FIG. 1, is utilized for grounding the sheath.

Figure 8:
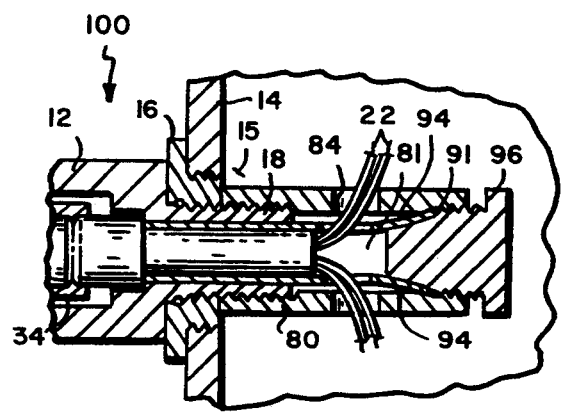
FIG. 8 is a longitudinal sectional view of an end connector in accordance with the present invention including an alternate embodiment of the cable support member within the equipment.

FIG. 8 illustrates an alternate embodiment of the end connector 100 which couples the cable 10 having dual peripheral support wires 94 to the equipment 14. The cable support member 80 includes an anchor nut 96 which is coupled to its front end by threaded engagement. As the anchor nut is tightened, the peripheral support wires are anchored in recessed portions 91 of the passageway 81. The openings 84 in the support member are provided for accessing the optic fibers 22.

Figure 9:
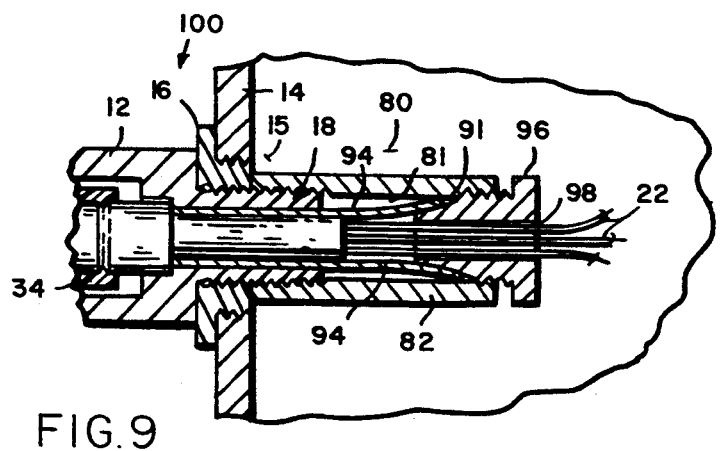
FIG. 9 is a longitudinal sectional view of an end connector in accordance with the present invention including an alternate embodiment of the cable support member within the equipment.

FIG. 9 illustrates yet another embodiment of the end connector 100 according to the present invention for coupling a cable having dual peripheral support wires to the equipment. The cable support member 80 is similar to that shown in FIG. 8, wherein the peripheral support wires 94 are anchored in the recess portions 91 by the anchor nut 96. In this embodiment, the anchor nut defines a passageway 98 for passing the optic fibers 22 therethrough for down-line connections (not shown). It will be appreciated by those of ordinary skill in the art that the cable 10 may include the corrugated armor sheath 48 in addition to the dual peripheral support wires 94, in which case the conductive seal 49 also may be utilized to ground the sheath.

Figure 10:
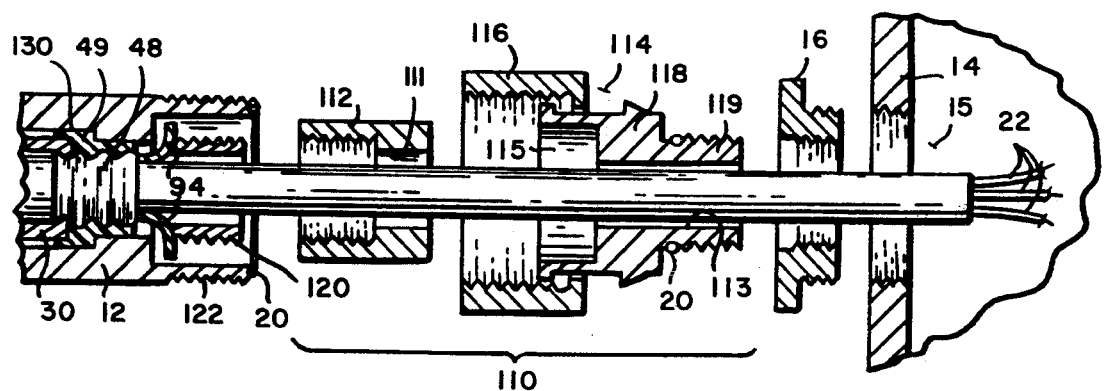
FIG. 10 is a longitudinal sectional view of an end connector in accordance with the present invention, including a cable support coupling member which is external of the equipment, both being shown in a disassembled and decoupled state.
Figure 11:
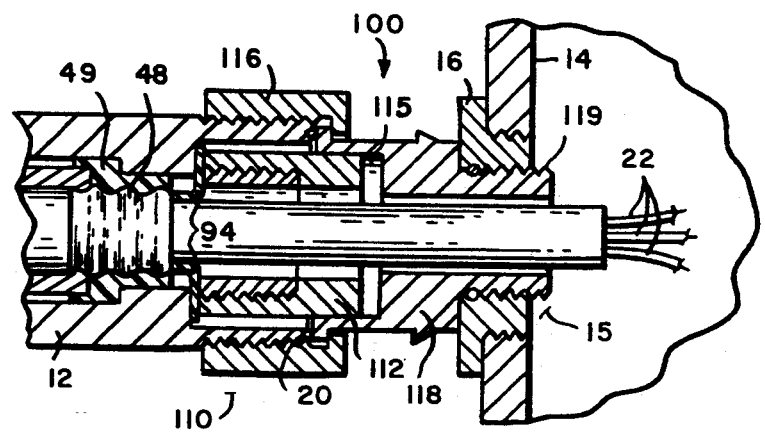
FIG. 11 is a longitudinal sectional view of the end connector and external cable support coupling member of FIG. 10 after assembly and coupling.

Referring now to FIGS. 10 and 11, an alternate embodiment of the end connector 100 according to the present invention is shown as including a cable support coupling member 110 disposed externally of the equipment 14 which serves to both support the cable 10 and couple the housing 12 to the port 15. The cable support coupling member 110 includes a support anchor nut 112 and a two-piece port coupler 114 having an anchor coupler nut 116 and a coupler chassis 118.

The support anchor nut 112 defines a passageway 111 for passing the cable therethrough. The support anchor nut is internally threaded at a rear end thereof so that it may be releasably coupled by threaded engagement to a threaded inner coupling extension 120 of the housing 12. The support anchor nut 112 serves to anchor support members associated with the cable 10 such as the peripheral support wires 94 against the front end of the housing 12 as shown in FIG. 11. If the peripheral support wires are conductive, the support anchor nut further serves to ground the support wires.

With respect to the port coupler 114, a passageway 113 is defined through the coupler chassis 118 for receiving the cable 10. A threaded coupling extension 119 is provided at a front end of the coupler chassis for releasable coupling by threaded engagement to the port bushing 16. An O-ring 20 is provided on the threaded coupling extension. A recess 115 is defined at a rear end portion of the coupler chassis.

An internally threaded anchor coupler nut 116 is slidably mounted on the rear end portion of the coupler chassis 118. The anchor coupler nut 116 and the coupler chassis 118 coact as a unit such that each is freely rotatable with respect to the other. The anchor coupler nut 116 is configured to be releasably coupled by threaded engagement to an outer threaded coupling extension 122, which is axially disposed at the front end of the housing 12 with respect to the inner threaded coupling extension 120. The anchor coupler nut 116 serves pull the coupler chassis 118 towards the housing 12, thus drawing the support anchor nut 112 within the recess 115 as shown in FIG. 11. An O-ring 20 is provided between the outer threaded coupling extension and the anchor coupler nut.

As will be appreciated by a person of ordinary skill in the art, the cable support coupling member 110 as herein described provides cable support, grounding, and a coupling apparatus which allows the housing 12 to be coupled to the equipment 14 without unnecessary rotation of the housing. The cable support coupling member is advantageous in situations where adequate space for such a support member is not available within the equipment. Furthermore, the cable support coupling member allows for the decoupling of the housing 12 and the cable 10 from the equipment without unnecessary disassembly of the housing and its internal components, and without the unnecessary removal of the cable from the end connector.

In the case where the cable 10 includes a corrugated armor sheath 48, it will be appreciated that the conductive seal 49 as described with reference to FIG. 1 may be utilized in order to ground the sheath. Furthermore, a voltage surge grounding member (not shown) may be provided between the front end of the cable clamp 30 and the conductive seal in order to ground possible high voltage surges applied to the cable. The voltage surge grounding member may be configured as a toothed spring washer or star washer. As the grounding member is compressed by the cable clamp during the assembly process, internal flexible flanges or teeth are forced to collapse to make pressure contact with the armor sheath 48. The grounding member provides a high current ground path from the sheath to the closest available ground point, in this case the housing 12.

Figure 12:
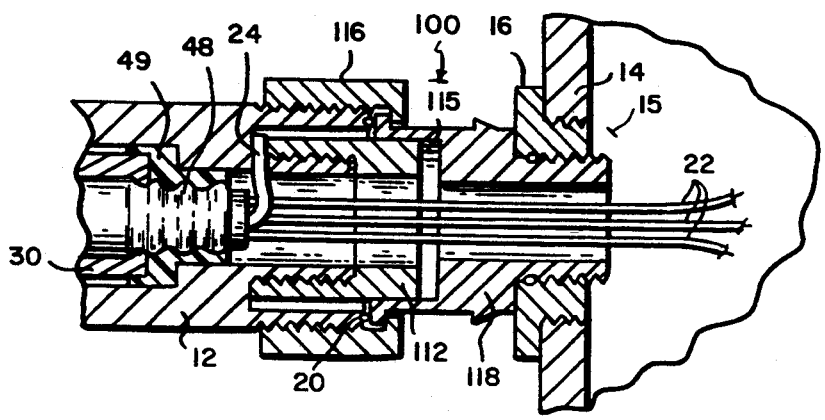
FIG. 12 is a longitudinal sectional view of another alternative embodiment of the end connector and external cable support coupling member in accordance with the present invention.

FIG. 12 illustrates an alternate embodiment of the end connector 100 according to the present invention including the cable support coupling member 110 as described with reference to FIGS. 10 and 11. The support anchor nut 112 of the cable support coupling member is shown securely anchoring the center support wire 24 to the front end of the housing 12. It will again be appreciated that the support anchor nut serves to ground the center support wire if the wire is conductive.

Figure 13:
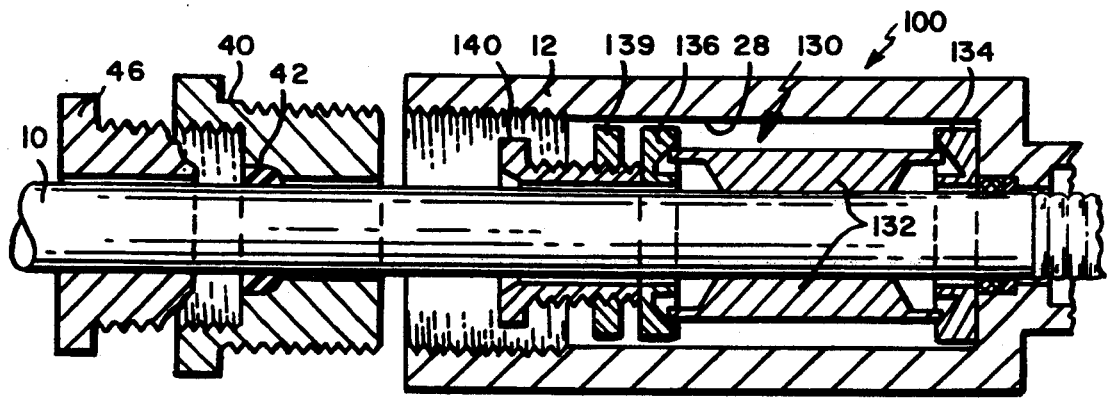
FIG. 13 is a longitudinal sectional view of an alternate embodiment of the end connector including an alternate embodiment of the cable clamp prior to being secured within the housing.
Figure 14:
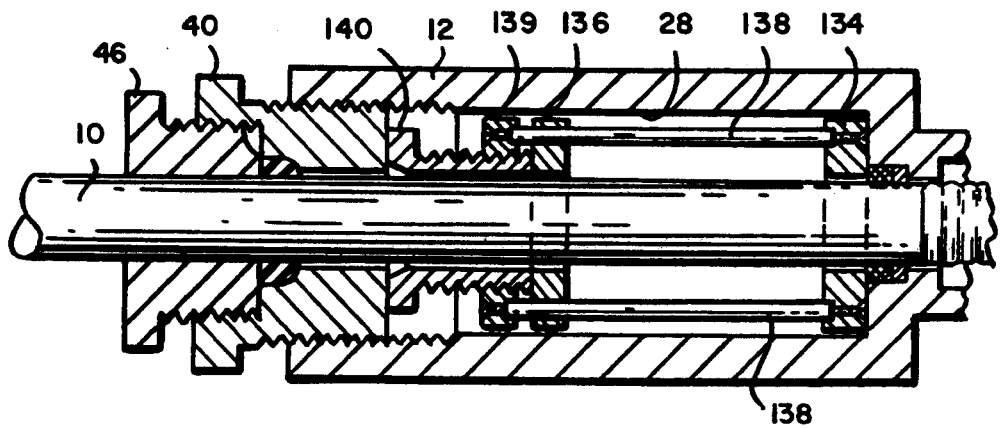
FIG. 14 is a longitudinal sectional view of the alternate embodiment of the end connector including the alternate embodiment of the cable clamp after being secured Within the housing.
Figure 15:
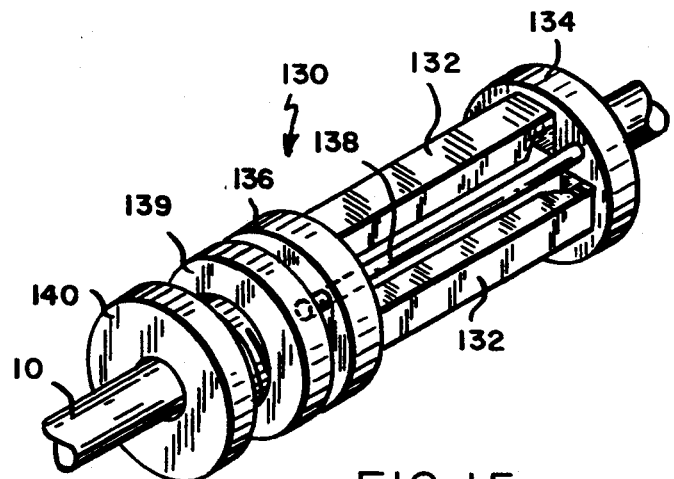
FIG. 15 is an isometric view of the alternate embodiment of the cable clamp illustrated in FIGS. 13 and 14.

With reference now to FIGS. 13 and 14, a further alternate embodiment of the end connector 100 according to the present invention is shown as including a multi-range drum or barrel type cable clamp 130, which is positioned within the passageway 28 for fixing the cable 10 securely within the housing 12. The cable clamp 130 is configured to be fixedly disposed within the passageway 28 at a location substantially surrounding the cable 10.

Referring additionally to FIGS. 15-19, it will be appreciated that the cable clamp 130 comprises a front end portion 134 fixed in relation to a rear end portion 139 by means of support rods extending therebetween. A moveable intermediate portion 136 is slidingly engaged with the support rods so as to enable axial displacement along the length of the support rods, thus the intermediate portion may be adjusted to various positions between the fixed front end portion and the fixed rear end portion. A threaded sleeve 140 is releasably coupled to a threaded passageway 139a of the rear end portion 139. The fixed front end portion 134, the moveable intermediate portion 136, the fixed rear end portion 139, and the threaded sleeve 140 also include respective passageways 134a, 136a, 140a for passing a cable therethrough. As the threaded sleeve 140 is threaded into the rear end portion, contact is made with the moveable intermediate portion 136 in order to axially displace the intermediate portion along the support rods.

The cable clamp 130 also includes a series (e.g. 4) of stave-like clamp bars 132 which are freely supported between the fixed front end portion 134 and the moveable intermediate portion 136. The front ends 133a of the clamp bars are retained in a groove 135 defined in the front end portion 134, and the rear ends 133b are retained in a groove 137 defined in the rear end portion 136. Both the front end and rear end grooves 135, 137 include respective angled, cam-like internal surfaces 135a, 137a. The cam-like surfaces are configured to make contact with the front end and rear end surfaces 133a, 133b, respectively, of each clamp bar 132.

The clamp bars 132 further include contact surfaces 132s which come into contact with and grip the cable. The contact surfaces may be provided with various abrasive type finishes to enhance the gripping force on the cable. Alternatively, the contact surfaces may also include ridges or serrations which would penetrate the outer jacket of the cable to a predetermined depth.

Figure 16:
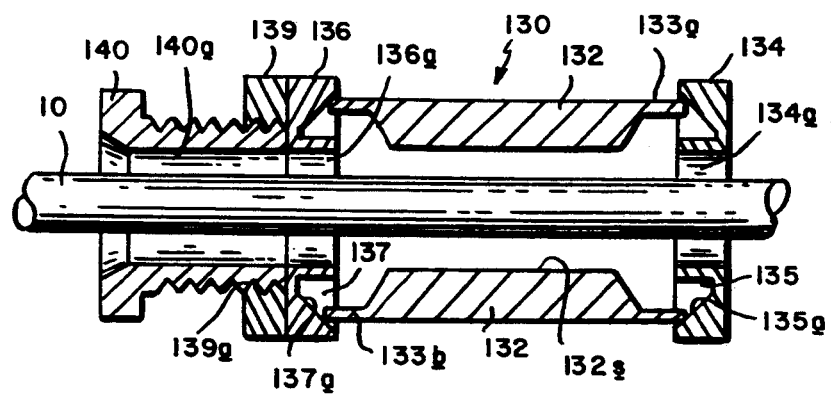
FIG. 16 is a side sectional view of the alternate embodiment of the cable clamp in an expanded state.
Figure 17:
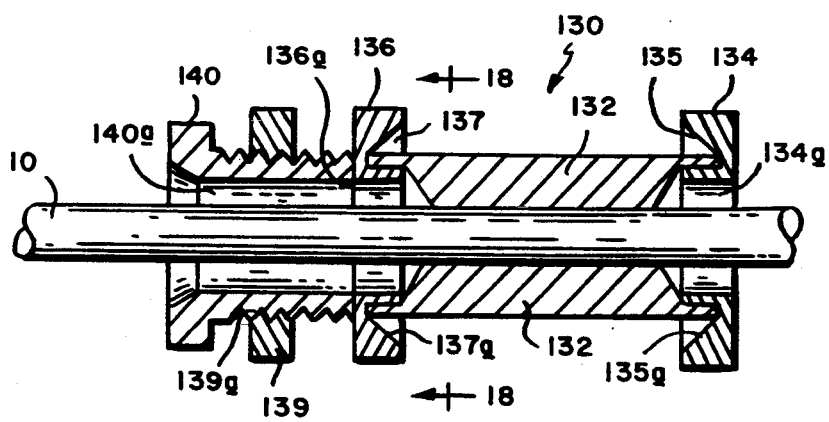
FIG. 17 is a side sectional view of the alternate embodiment of the cable clamp in a constricted state with the support rods omitted.
Figure 18:
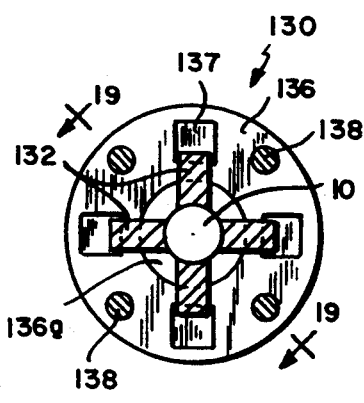
FIG. 18 is a sectional view of the alternate embodiment of the cable clamp taken along line 18—18 of FIG. 17.
Figure 19:
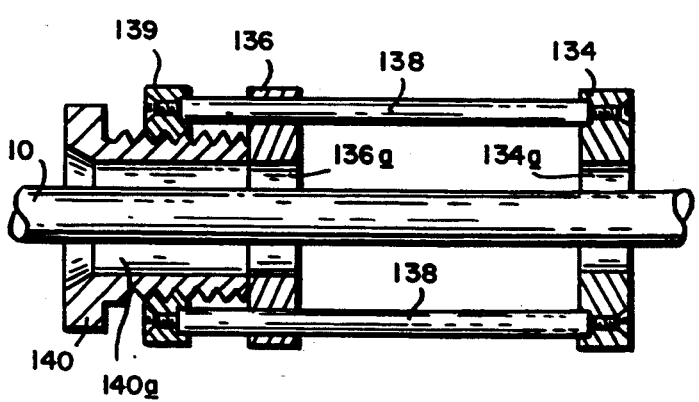
FIG. 19 is a side sectional view of the alternate embodiment of the cable clamp in a constricted state with the clamp bars omitted taken along line 19—19 of FIG. 18.

Initially during use, the prepared cable is fed through the passageways 134a, 136a, 140a of the cable clamp 130 so that the cable is surrounded by the front end portion 134, the intermediate portion 136, the rear end portion 139, in addition to being at east partially surrounded by the clamp bars 132 as shown in FIG. 14A. The threaded sleeve is thereafter threaded into the rear end portion 139, thus causing the moveable intermediate portion 136 to slide along the support rods 138. As the intermediate portion is forwardly displaced, the front and rear clamp bar ends 133a, 133b respectively become engaged with the front and rear end cam surfaces 135, 137 of the front end portion 134 and the intermediate portion 136. In turn, the clamp bars 132 are constricted inwardly so that the contact surfaces 132s apply increasing pressure to the cable as best shown in FIGS. 16 and 17. The cable may be released by unthreading the sleeve 140 from the rear end portion 139. Once the cable clamp is secured on the cable, the unit may be placed in and secured in the passageway 28 of the housing 12 as shown in FIGS. 13 and 14. Thereafter the housing 12 may be coupled to the equipment port with anyone of the configurations described herein with reference to FIGS. 1-12.

As the inwardly threaded sleeve forces the intermediate portion to be forwardly displaced, the clamp bars provide holding power without subjecting the cable to potentially damaging distortion. During disassembly, the clamp bars 132 retract or expand as the sleeve is disengaged from the rear end portion 139. The expansion of the clamp bars 132 allows enough clearance so that the cable 10 may be removed from the housing during maintenance procedures.

The clamping pressure applied to the cable effectively holds the cable in a secure position and provides resistance to rotational and longitudinal forces applied to the cable during installation or operation, and provides excellent resistance to rotational twisting or slippage, as well as resistance to rotational slippage.

The cable clamp 130 is configured to accommodate a broad range of cable sizes and shapes without requiring a change in the size of the housing 12 and related components.

While many of the components described herein with respect to the end connector 100 according to the present invention have been shown to be releasably coupled to one another by threaded engagement, it will be appreciated by those skilled in the art that the components may be engaged to one another by any conventional coupling technique. For instance, pressure or snap fittings may be utilized in order to releasably couple the components to one another.

Having shown illustrative embodiments, those skilled in the art will realize many variations are possible which will still be within the scope and spirit of the claimed invention. Therefore, it is the intention to limit the invention only as indicated by the scope of the claims.

What is claimed is:

1. An end connector for connecting a fiber optic cable to a port associated with a piece of equipment, said cable having at least one optic fiber and at least one other support member surrounded by a jacket, said end connector comprising:
   a housing member having a front end and a rear end, said housing member defining a passageway extending from said rear end to said front end for passing said cable therethrough;
   coupling means for coupling said housing member to said port;

clamp means received in said passageway and adapted to at least partially surround said cable, said clamp means being adjustable between an expanded state which accommodates movement of said cable with respect to said housing and a constricted state which fixedly secures said cable with respect to said housing;

clamp adjustment means for adjusting said clamp means between said expanded and said constricted states; and a conductive seal disposed within said passageway adjacent said clamp means, said conductive seal being deformed so as to come into close contact with a conductive shield member associated with said cable as said clamp means is adjusted to said constricted state, said conductive seal effectively grounding said shield member in order to prevent Spurious signals from penetrating said cable.

2. The end connector as claimed in claim 1, further comprising a high voltage surge grounding member disposed between said clamp means and said conductive seal and which is arranged to contact said conductive shield member as said clamp means is adjusted to said second position for grounding high voltage surges applied to said cable.

3. An end connector for connecting a fiber optic cable to a port associated with a piece of equipment, said cable having at least one optic fiber surrounded by a jacket, said end connector comprising:

a housing member having a front end and a rear end, said housing member defining a passageway extending from said rear end to said front end for passing said cable therethrough;

coupling means for coupling said housing member to said port;

a cable clamp received in said passageway and adapted to at least partially surround said cable, said cable clamp being displaceable along said passageway between a first position which allows movement of said cable with respect to said housing and a second position which applies a clamping pressure to said cable so as to fixedly secure said cable within said housing;

a clamp engagement member releasably coupled within said passageway at said rear end of said housing member, said clamp engagement member being arranged to contact said cable clamp and to urge said cable clamp to displace to said second position; and a conductive seal disposed within said passageway adjacent said cable clamp, said conductive seal being deformed so as to come into close contact with a conductive shield member associated with said cable as said cable clamp is displaced to said second position, said conductive seal effectively grounding said shield member in order to prevent spurious signals from penetrating said cable.

4. The end connector as claimed in claim 3, further comprising a high voltage surge grounding member disposed between said cable clamp and said conductive seal and which is arranged to contact said conductive shield member as said cable clamp is adjusted to said second position for grounding high voltage surges applied to said cable.

5. An end connector for connecting a fiber optic transport cable to a port associated with an equipment, said cable having at least one optic fiber and at least one other support member surrounded by a jacket, said end connector comprising;

a clamp housing member adapted to clamp said cable in a secure position so as to provide resistance to longitudinal and rotational forces applied to said cable said clamp housing member including a high voltage surge grounding member which contacts a conductive shield associated with cable for grounding high voltage surges applied to said cable;

coupling means for releasably coupling said clamp housing member and said cable to said port; and cable supporting means disposed internal said equipment for supporting said cable within said equipment and being releasably coupled to said coupling means.

6. An end connector for connecting a fiber optic transport cable to a port associated with an equipment, said cable having at least one optic fiber and at least one other support member surrounded by a jacket, said end connector comprising:

a clamp housing member adapted to clamp said cable in a secure position so as to provide resistance to longitudinal and rotational forces applied to said cable said clamp housing member comprises a high voltage surge grounding member which contacts a conductive shield associated with cable for grounding high voltage surges applied to said cable;

a front end coupler disposed at a front end of said clamp housing member; and cable supporting means disposed external said equipment for supporting said cable and being releasably coupled at one end to said front end coupler and being releasably coupled at the opposite end to said port such that said end connector may be coupled and decoupled as a unit from said port without rotating said housing member and said cable, and without removing said cable from said end connector.

* * * * *